US008239551B2

(12) United States Patent
Oda et al.

(10) Patent No.: US 8,239,551 B2
(45) Date of Patent: Aug. 7, 2012

(54) USER DEVICE, CONTROL METHOD THEREOF, AND IMS USER EQUIPMENT

(75) Inventors: Toshikane Oda, Tokyo (JP); Shingo Murakami, Yokohama (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 238 days.

(21) Appl. No.: 12/518,207

(22) PCT Filed: Oct. 11, 2007

(86) PCT No.: PCT/JP2007/070300
§ 371 (c)(1),
(2), (4) Date: Jun. 8, 2009

(87) PCT Pub. No.: WO2008/068963
PCT Pub. Date: Jun. 12, 2008

(65) Prior Publication Data
US 2010/0030904 A1 Feb. 4, 2010

Related U.S. Application Data

(60) Provisional application No. 60/869,158, filed on Dec. 8, 2006.

(51) Int. Cl.
*G06F 15/16* (2006.01)

(52) U.S. Cl. ...................................................... 709/228

(58) Field of Classification Search ........... 709/228–230
See application file for complete search history.

(56) References Cited

U.S. PATENT DOCUMENTS

2007/0143489 A1* 6/2007 Pantalone ..................... 709/230

OTHER PUBLICATIONS

UPnP Forum. UPnP Device Architecture 1.0. pp. 1-76. Jul. 2006.*
Smartcard Web Server Requirements. Open Mobile Alliance. Draft Version 1_0. pp. 1-22. Jul. 2005.*
RFC 2818. HTTP Over TLS. pp. 1-7. May 2000.*
Chaffin et al. Practical VoIP Security. pp. 1-24. Mar. 30, 2006.*
Haber et al. UPnP Control Point for Mobile Phones in Residential Networks. http://ikt.hia.no/aml/papers/060100-IST-Mobile%20Summit-2006/andreas-haber-phone-based-upnp-control.pdf. pp. 1-5. Jun. 2006.*
UPnP Security Ceremonies Design Document. www.upnp.org/specs/sec/UPnP-sec-UPnPSecurityCeremonies-v1.pdf. pp. 1-18. Oct. 3, 2003.*
Understanding Universal Plug and Play White Paper. Microsoft Corporation. 2000. pp. 1-39.*

* cited by examiner

*Primary Examiner* — John MacIlwinen

(57) ABSTRACT

There is provided a user device that is equipped with IMS functionality. The user device includes: searching means for searching, based on UPnP technology, a UPnP network for another user device that has IMS subscription information, establishing means for establishing a session with the other user device discovered by the searching means, retrieving means for retrieving the IMS subscription information from the other user device via the session, and sending means for sending a first SIP register message including the IMS subscription information to an IMS network.

15 Claims, 14 Drawing Sheets

USER DEVICE, CONTROL METHOD THEREOF, AND IMS USER EQUIPMENT

This application claims the benefit of U.S. Provisional Application No. 60/869,158, filed Dec. 8, 2006, the disclosure of which is fully incorporated herein by reference.

TECHNICAL FIELD

The present invention generally relates to a user device, a method for controlling the user device, and an IP Multimedia Subsystem (IMS) user equipment. The present invention particularly relates, but is not limited to, a technology that enables the user device to access an IMS network.

BACKGROUND

Remote access to a SIM card (or UICC, smartcard) has been utilized in a number of different use scenarios in which the remote access to the SIM card enables other user devices to download personal information from the remote SIM user device. The personal information includes user identity, credentials, and so on, with which the user is able to enjoy services offered by network operators and corresponding service providers on the local user device. In this sense, the remote SIM access provides a capability to the users to comprise a "virtual" user device that is comprised of the local user device and the remote UICC. As of today, we can see several prior art references that give mechanisms, use cases or service requirements for the remote SIM access concept:

The 3GPP (3$^{rd}$ Generation Partnership Project) TSG SA WG3 discussed several different models and scenarios of IMS UE (User Equipment) function split over a user device like a PC connected to a fixed IP network and UMTS terminal with IMS support, which includes the scenario where IMS-Client on a PC and USIM and ISIM located on the UICC in the UMTS terminal are linked through some interface so that the PC with UMTS terminal can be used as an IMS UE.

Fixed Mobile Convergence Alliance gives the service requirements for SIM Access and Authentication service where a SIM in the mobile handset is being used as authentication token on other user devices for the fixed-mobile convergence environment defined by the FMCA (Fixed-Mobile Convergence Alliance).

ETSI TS 102 412 gives the service requirements of the remote UICC access, for example a remote terminal such as PC accesses UICC for personal data downloading (e.g. pictures, movies) and for content license transfer stored in UICC for DRM applications.

Bluetooth SIM Access Profile provide a means to allow user devices such as car phones with built in GSM transceivers to connect to a SIM card in a phone with Bluetooth, so the car phone itself doesn't require a separate SIM card (refer to IBM Developer Works, "Bluetooth SIM Access Profile," http://www-128.ibm.com/developerworks/wireless/library/wi-simacc/).

ETSI TISPAN (European Telecommunications Standards Institute Telecoms& Internet converged Services & Protocols for Advanced Networks) also has introduced an IMS residential gateway that enables non-ISIM or non-USIM capable networked user devices in home or enterprise networks to gain access to IMS services with support of the gateway. "An IMS Gateway for Service Convergence in Connected Homes," Tobjorn Cagenius, et al., FITCE 2006 has also proposed a similar concept by introducing the concept of the Home IMS Gateway (HIGA). The IMS residential gateway serves for the purpose to securely connect legacy, non-IMS user devices (e.g., SIP phones) that do not have the capability of using an ISIM/UICC, to the IMS networks. The IMS residential gateway is comprised of IMS terminal functionality and an ISIM application to act as a SIP B2BUA that interconnects non-IMS user devices and the IMS network. One potential embodiment of the home IMS gateway is presented in FIG. 1. With this scenario, remote non-IMS user devices such as an IP device 101 and a SIP device 102 utilize SIM information stored in an ISIM 103 of the IMS residential gateway 100 indirectly by means of the SIP B2BUA functionality 104 of the IMS residential gateway 100. SIP UA/UA Proxy 105 intermediates between IP device 101 and B2BUA 104 by converting non SIP signaling that is received from the IP device 101 to SIP signaling that is sent to the SIP B2BUA 104, and vice versa.

On the other hand, for realizing remote SIM access, some mechanism in the local environment is eventually required to dynamically discover available user devices (i.e., SIM and/or client devices), to pair up the discovered user devices, and to start communication between the user devices. As of today, we see the following prior art references:

Bluetooth SIM Access Profile provides the mechanism using standard Bluetooth technology of discovery and pairing.

FMCA gives a requirement that, in the convergence environment where a mobile handset is used in conjunction with other user device in the home network, the capabilities provided by mobile handsets should be able to be discovered by other user devices in their local environment using standards such as UPnP. It is obvious that a UPnP based approach has been a known concept for discovery of the remote SIM access service provided by the mobile handset.

Kapil Sachdeva, "Device coordination with web applications," (2006-02), http://www.w3.org/2006/02/axalto-paper.html presented the concept of user device coordination with web applications with special attention to network security devices such as smart cards. This paper stated about the network concept where the smart cards are being built to use standard networking protocols such as TCP/IP and such smart cards will be discovered via device discovery protocols such as UPnP. No concrete solutions for smartcard discovery, however, are presented.

Problems with Existing Solutions

There is no complete solution in the market that enables dynamic discovery of available IMS terminal components and ISIM application components in the networked user devices and dynamic composition of an IMS UE by binding those user devices and components.

Bluetooth SIM Access Profile could be one solution for the realization; however, it is difficult to mandate all the home user devices to equip with Bluetooth adapters considering less availability of Bluetooth-equipped user devices in the present market than WLAN.

Although a UPnP-based solution is indicated by FMCA and Kapil Sachdeva, its concrete solution for pairing a user device and U/ISIM in an IMS phone has not yet appeared.

SUMMARY

To solve the above problem, the present invention provides the solutions including new procedures for the dynamic discovery and selection of the components for the composition that the user wishes to have and for binding the selected components.

The invention utilizes UPnP (Universal Plug and Play) technology for device and service discovery in the proposed procedures.

The invention proposes two alternative solutions, which are differentiated by which user device the user initiates UPnP discovery and composition processes.

Each solution defines necessary UPnP devices and services for enabling the dynamic discovery of the IMS terminal components and/or U/ISIM applications which represent IMS subscriptions. It also enables the dynamic composition of IMS UEs over the UPnP network.

The invention also provides a solution option in defining a UPnP service for IMS subscription service by utilizing the existing remote SIM access technology (i.e., Smart Card Web Server) developed by OMA.

According to an aspect of the present invention, there is provided a user device that is equipped with IMS functionality. The user device includes: searching means for searching, based on UPnP technology, a UPnP network for another user device that has IMS subscription information, establishing means for establishing a session with the other user device discovered by the searching means, retrieving means for retrieving the IMS subscription information from the other user device via the session, and sending means for sending a first SIP register message including the IMS subscription information to an IMS network.

According to another aspect of the present invention, there is provided a method for controlling a user device that is equipped with IMS functionality. The method includes steps of: searching, based on UPnP technology, a UPnP network for another user device that has IMS subscription information, establishing a session with the other user device discovered in the step of searching, retrieving the IMS subscription information from the other user device via the session, and sending a first SIP register message including the IMS subscription information to an IMS network.

According to yet another aspect of the present invention, there is provided an IMS user equipment composed of the above-described user device that is equipped with IMS functionality and the above-described other user device that has IMS subscription information.

According to another aspect of the present invention, there is provided a user device that has IMS subscription information. The user device includes: searching means for searching, based on UPnP technology, a UPnP network for another user device that is equipped with IMS functionality, establishing means for establishing a session with the other user device discovered by the searching means, and sending means for sending the IMS subscription information to the other user device via the session.

According to yet another aspect of the present invention, there is provided a method for controlling a user device that has IMS subscription information. The method includes steps of: searching, based on UPnP technology, a UPnP network for another user device that is equipped with IMS functionality, establishing a session with the other user device discovered in the step of searching, and sending the IMS subscription information to the other user device via the session.

According to another aspect of the present invention, there is provided an IMS user equipment composed of the above-described user device that has IMS subscription information and the above-described other user device that is equipped with IMS functionality.

It should be noted that the term "user device" is used to indicate any kinds of devices such as a personal computer (PC), a fixed IMS phone, a mobile IMS phone, a laptop computer, a Set Top Box (STB), a TV, a printer, an IMS residential gateway, and so on. Moreover, the above-described IMS subscription information may be contained in a USIM or ISIM application of the user device.

The main advantage of the present invention is that the user can dynamically discover available IMS termination functions and IMS subscriptions (i.e., USIM or ISIM) in the UPnP network, which enables the dynamic composition of an IMS user agent.

Further features of the present invention will become apparent from the following description of exemplary embodiments with reference to the attached drawings, in which like reference characters designate the same or similar parts throughout the figures thereof.

DETAILED DESCRIPTION

Preferred embodiments of the present invention will now be described with reference to the attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are necessarily required for realizing the present invention.

Considering the recent trend in remote SIM access, home networking, and IMS, this invention deals with IMS UE function split over different networked user devices and UICC user devices containing an IMS subscription (USIM or ISIM). The objective of this invention is to give concrete means to dynamically compose an IMS UE considering the similar concept and scenario discussed in 3GPP TSG SA WG3. User devices containing a USIM and/or ISIM located on a UICC include fixed IMS phones and mobile IMS phones. We assume the following (FIG. 2):

Some home networked user devices (e.g., STB, TV, printers, etc.) are equipped with IMS terminal functionality by means of software components (e.g., software IMS Client as discussed in 3GPP TSG SA WG3).

Some home networked user devices are equipped with ISIM (or USIM) applications which may be stored in a UICC or in a form of software component in the memory areas of the user devices, which represents an IMS subscription to provide a user identity and necessary credentials to access IMS network. These user devices may be IMS residential gateways or IMS-capable fixed or mobile phones equipped with ISIM applications or equivalents such as USIM applications to be used as IMS subscription.

All of these home networked user devices are enabled to interconnect with one another to communicate within the home network, for example via Ethernet and WLAN.

Note that there may be cases in which both the IMS terminal functionality and the U/ISIM application reside in a single user device.

The present invention provides a means to enable the user to dynamically compose an IMS user equipment (IMS UE) in the home network on an on-demand basis, by binding one of the IMS terminals to one of the U/ISIM applications in the home network. By this means, the invention enables the user to electronically combine an IMS subscription used by an IMS operator (i.e., ISIM or the equivalent by USIM) with another user device that doesn't have an IMS user identity (i.e., ISIM or the equivalent by USIM) but only has an IMS terminal functionality in terms of IMS protocol stack and IMS application client functions.

Figure 1:
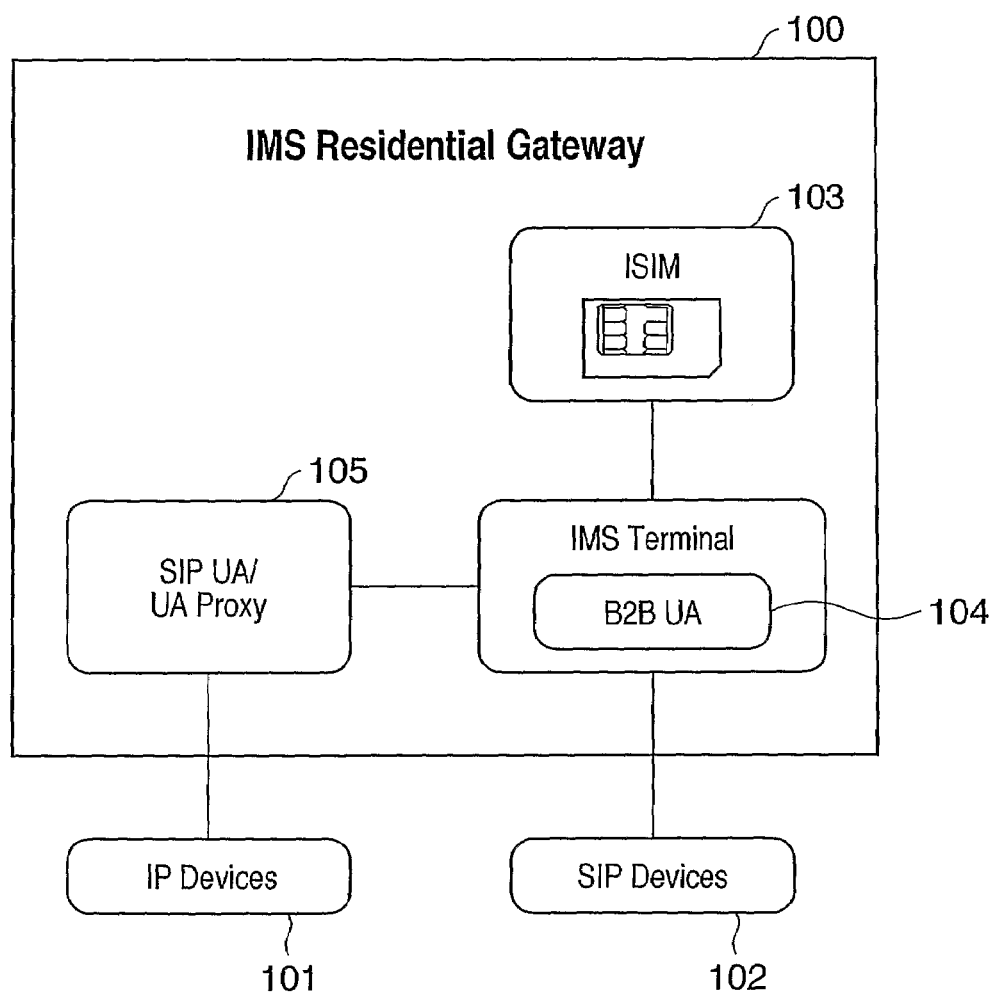
FIG. 1 illustrates a conventional IMS residential gateway.
Figure 2:
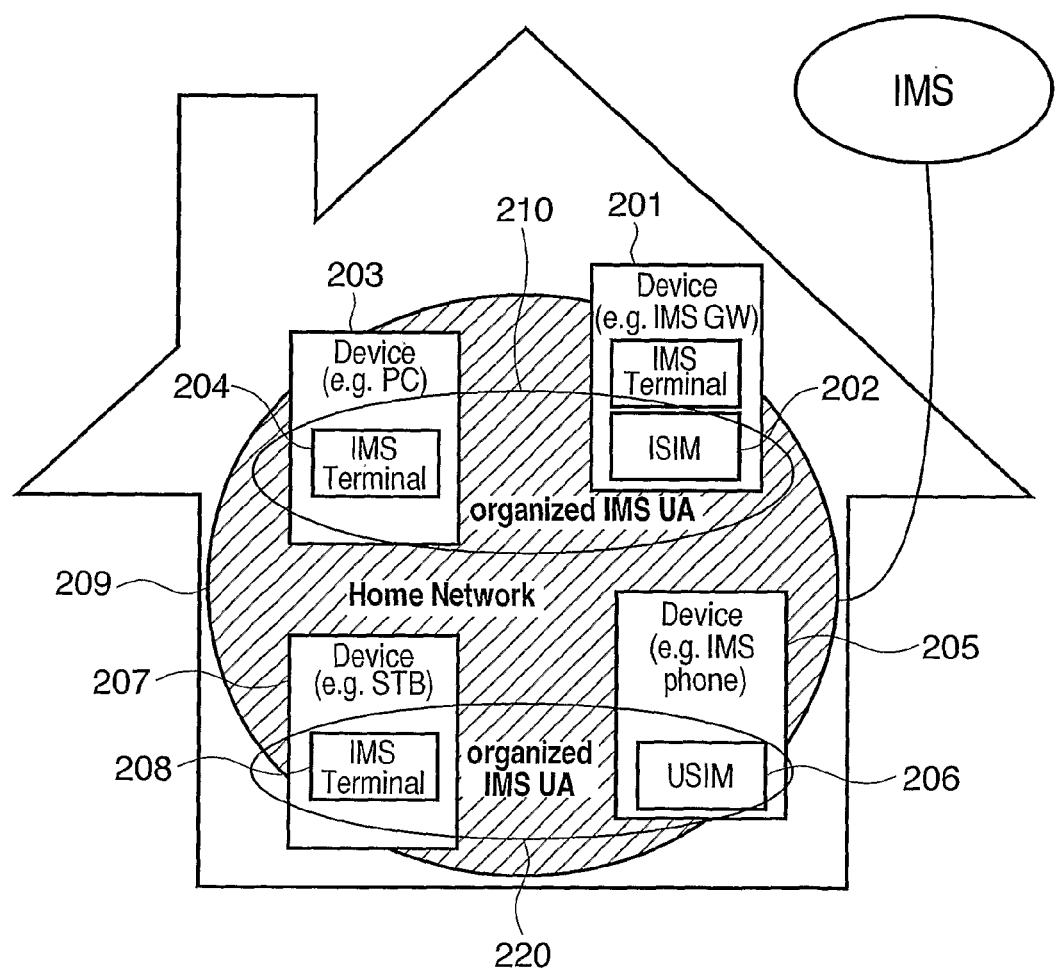
FIG. 2 illustrates dynamic composition of IMS User Equipments (UEs) by combining IMS user devices and U/ISIM holding user devices.

As shown in FIG. 2, an IMS UA 210 can be virtually organized for example by combining an IMS terminal functionality 204 of a user device 203 (e.g. a PC) with an ISIM application 202 of a user device 201 (e.g. an IMS GW). For another example, another IMS UA 220 can be virtually organized by combining an IMS terminal functionality 208 of a user device 207 (e.g. a STB) with a USIM application 206 of a user device 205 (e.g. an IMS phone). All these user devices 201, 203, 205 and 207 are connected through home network 209.

This is a different approach compared to the present IMS residential gateway acting as the SIP B2BUA where non-IMS user devices utilize both the IMS terminal component and the ISIM application component of the gateway. When the present invention is applied to a local network where an IMS residential gateway is connected, only ISIM application components in the IMS residential gateway are utilized by the other user devices that equip the IMS terminal components of themselves.

[Solution A]

Figure 3:
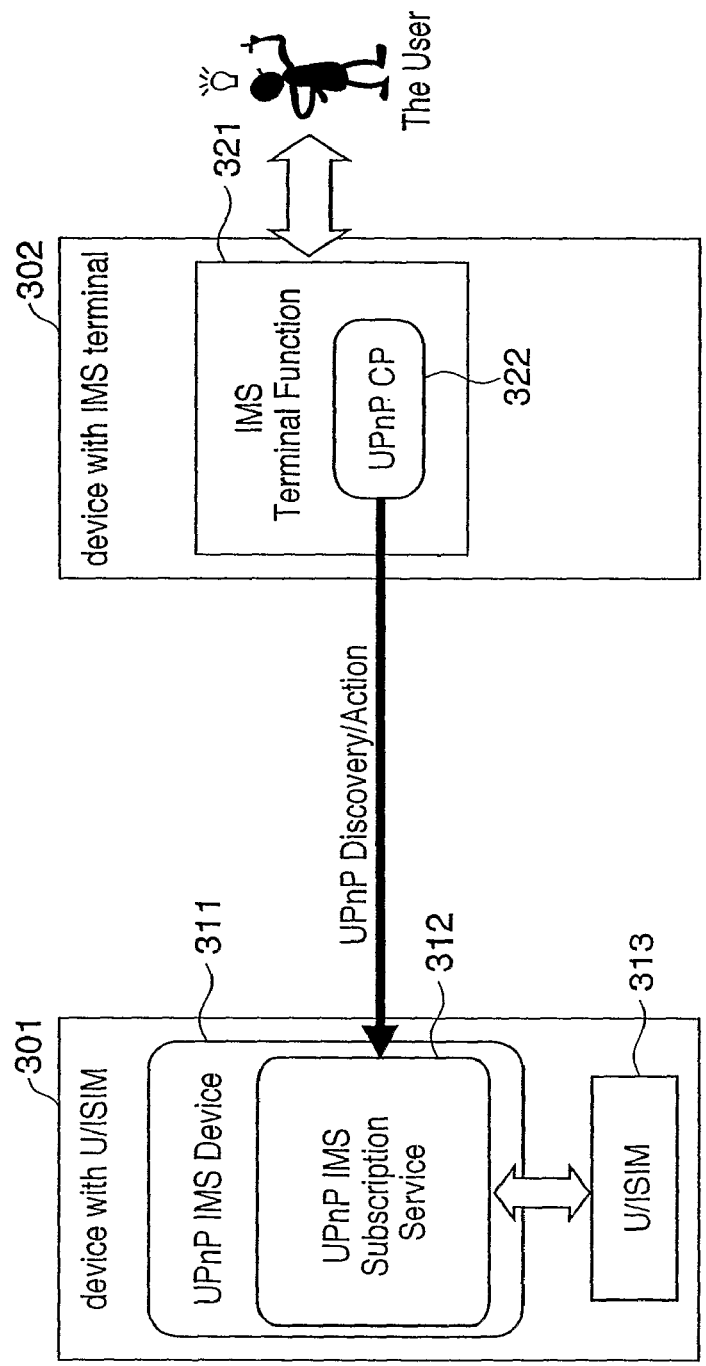
FIG. 3 illustrates an overview of "Solution A" according to the embodiment of the present invention.

Solution A (FIG. 3) is applied to the following service scenario:

The user initiates UPnP discovery of available IMS subscriptions (i.e., U/ISIM) using his/her user device 302 such as a laptop computer which is equipped with an IMS terminal function 321, and the IMS subscription discovered through UPnP is used for IMS registration.

A UPnP Control Point (CP) 322 resides in the IMS user device 302. The IMS terminal function 321 internally interacts with the CP 322 in order to retrieve necessary information required for IMS registration through the CP 322. The CP 322 retrieves such information from a remote UPnP user device 301: an IMS Device 311 defined by the invention by using the UPnP protocol. The IMS Device 311 provides a UPnP service called an IMS Subscription Service 312 that is capable of accessing a local U/ISIM 313 to retrieve necessary information and credentials for IMS registration. The IMS Subscription Service 312 provides, but is not limited to, the following actions to be invoked by the CP 322:

Pairing:

This action is used to establish a logical pairing between the CP 322 and the IMS Subscription Service 312. It also establishes shared keys to encrypt and decrypt confidential information exchanged between the CP 322 and the IMS Subscription Service 312. The mechanism of such a key establishment is not defined in this invention, but existing mechanisms (e.g., PIN, certificates, or 3GPP TS33.110) can be applied. When the pairing is established, the IMS Subscription Service 312 sets a timer for the lifetime of the pairing and informs the CP 322 of it. When the timer fires, the pairing is considered to be expired unless the CP 322 resubmits the pairing action within the expiration period.

Registration Information Request:

This action is used to request necessary information from the IMS Subscription Service 312 so that the CP 322 can use the information to generate necessary SIP messages and send an initial SIP Register request to the IMS core system. The information includes, but is not limited to, an IMPI, IMPUs, P-CSCF address, Home Domain URI, which are derived from the ISIM. In the case of USIM, the information includes an IMSI.

AKA Authentication:

This action is used to send a random challenge (RAND) and a network authentication token (AUTN) received from the IMS core system to the IMS Subscription Service 312, which then inputs these values to the U/ISIM 313 to verify the AUTN and calculate RES, CK and IK, according to the AKA algorithm. The IMS Subscription Service 312 returns those derived RES, CK, and IK to the CP.

TerminatePairing:

This action is used to terminate an existing pairing between the CP 322 and the IMS Subscription Service 312. This action having been performed, no other actions except for the Pairing action are possible.

Figure 4:
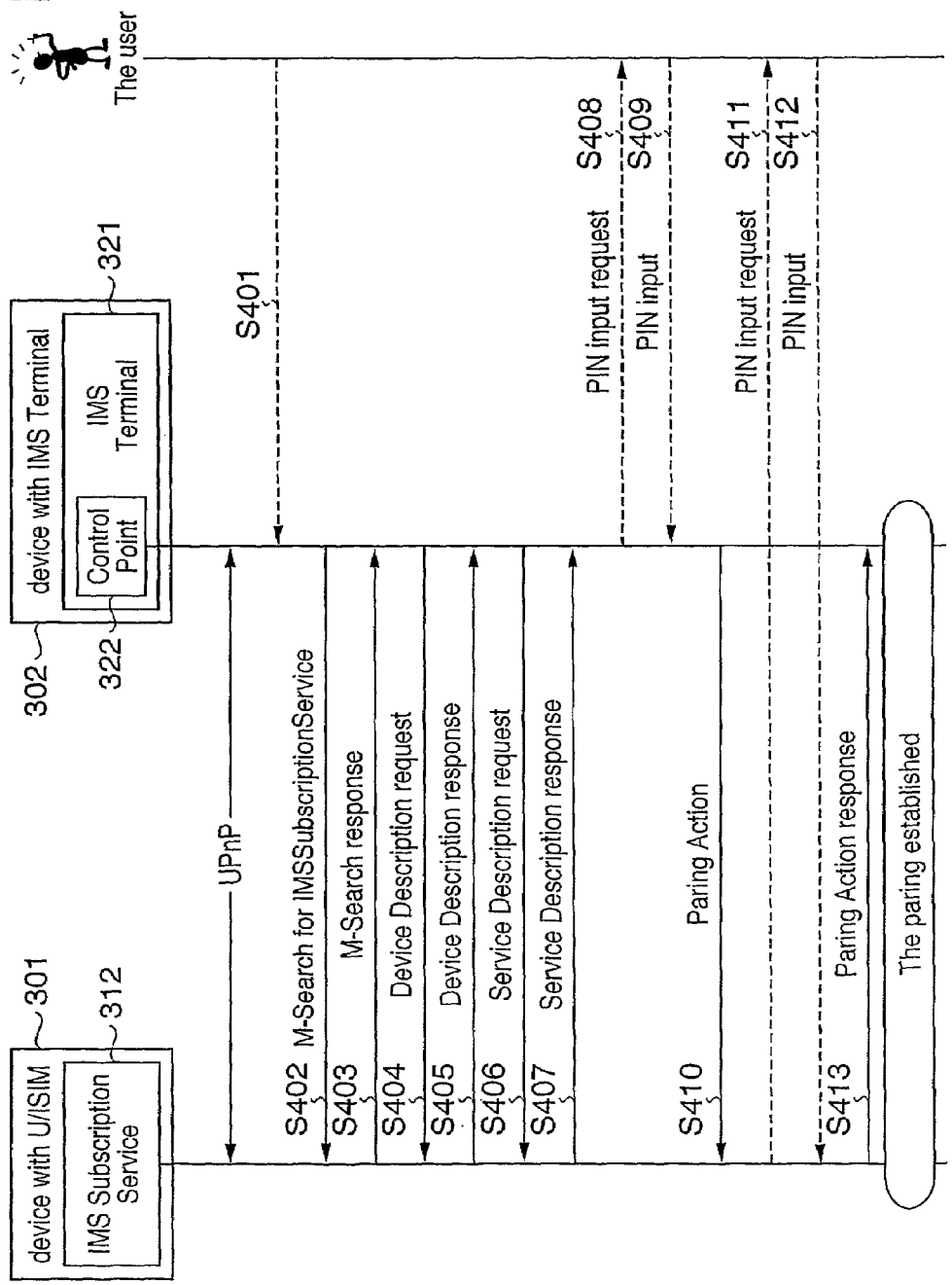
FIG. 4 illustrates a procedure where an IMS user device discovers and selects an IMS subscription service of a U/ISIM holding user device and establishes a paring with the U/ISIM holding user device in Solution A.
Figure 5:
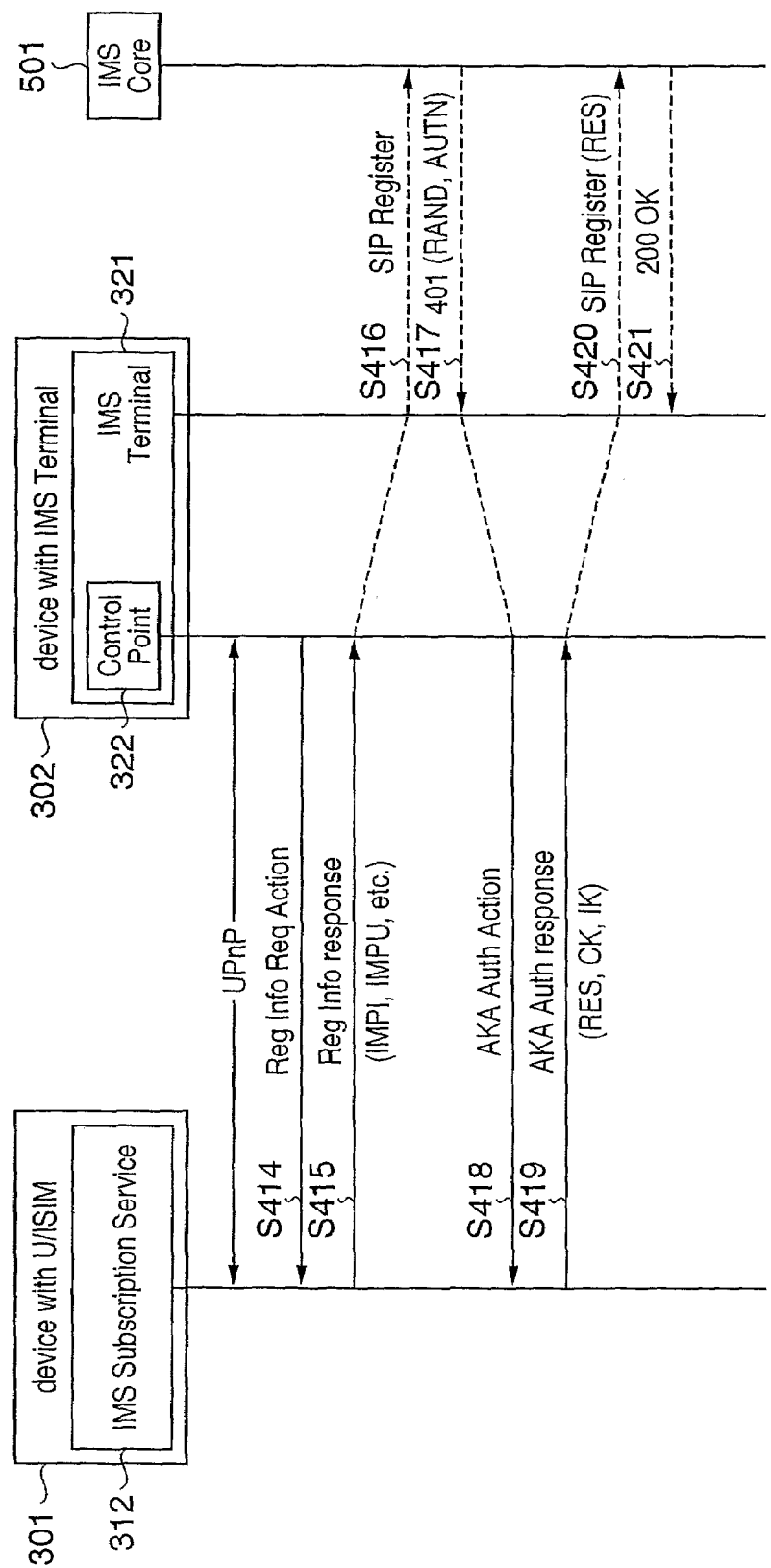
FIG. 5 illustrates an IMS registration procedure in Solution A.

FIGS. 4 and 5 illustrate an example procedure of how IMS registration is performed using the IMS Subscription Service. Dotted arrows represent out of band signals between the user and the user devices 301 or 302 (e.g., displaying a PIN Input dialog box on a device screen). It should be noted that the pairing mechanism shown in the example is based on simple PIN inputs by the user on the both user devices. The other pairing mechanisms should be possible.

In step S401, the user initiates an IMS registration via the CP 322. The CP 322 starts discovery of IMS Subscription Service 312.

In steps S402-S407, the CP 322 performs the standard UPnP discovery procedure. The service type to discover is set to a defined service identifier in the form of URN (Uniform Resource Name) for IMS Subscription Service 312. If the multiple user devices owning the target service are discovered, the user selects one user device out of the discovered user devices after step S407, based on the information contained in the device description or service descriptions. One means for the selection by the user is by display of a list of telephone numbers or SIP URIs to the user, where those identities are contained in the service description of IMS Subscription Service 312. This helps the user to select the target user device.

After the target user device is selected, in steps S408-S409, the CP 322 requests the user to input a PIN code.

In step S410, the CP 322 sends a Pairing action request. In the example to describe the proposed procedure, the request contains a random nonce (nonce1) and an authentication code generated by authenticationCode=SHA-1 (PIN, nonce1).

In steps S411-S412, the IMS Subscription Service 312 requests the user to input the (same) PIN again on this user device.

The IMS Subscription Service 312 calculates an authentication code with two inputs, in other words, the PIN just input and the nonce1 received in step S411. If the two authentication codes match, authentication of the CP 322 is considered successful.

In step S413, the IMS Subscription Service 312 returns a Paring response. This response includes two new random nonce's (nonce2 and nonce3) and an authentication code (=SHA-1(PIN, nonce2)). The CP 322 generates the authentication code using the PIN and the nonce2 to verify the authenticity of the corresponding IMS Subscription Service 312. The nonce3 is used so that both the IMS Subscription Service 312 and the CP 322 can agree on a shared key: sharedKey=SHA-1(PIN, nonce3).

At this time, the pairing is successfully established.

Following step S413, the CP 322 proceeds with following steps shown in FIG. 5:

In steps S414-S415, the CP 322 performs the Registration Information Request action. The IMS Subscription Service 312 returns information necessary for the IMS terminal 321 to send an initial SIP Register request, which includes IMPI, IMPU, P-CSCF address, Home Domain URI, and the like. In the case of USIM, IMSI is returned.

In steps S416-S417, the IMS terminal 321 sends an initial SIP Register request using the information. It then receives a 401 response including RAND and AUTN from the IMS Core system 501.

In steps S418-S419, the CP 322 invokes an AKA Authentication action with arguments: the RAND and AUTN. The IMS Subscription Service 312 inputs the RAND and AUTN to the U/ISIM 313 to obtain RES, CK, and IK, which are eventually sent back to the CP 322. Note all credentials exchanged during AKA Authentication action shall be protected by the shared key established at the pairing phase using, for example, XML Encryption (refer to http://www.w3.org/TR/xmlenc-core/). However, the encryption mechanism is not part of the invention.

In steps S420-S421, the IMS terminal function 321 re-sends a SIP Register containing the RES, which results in successful IMS registration. CK/IK is used to establish IPsec channels toward the IMS Core system 501.

[Solution B]

Figure 6:
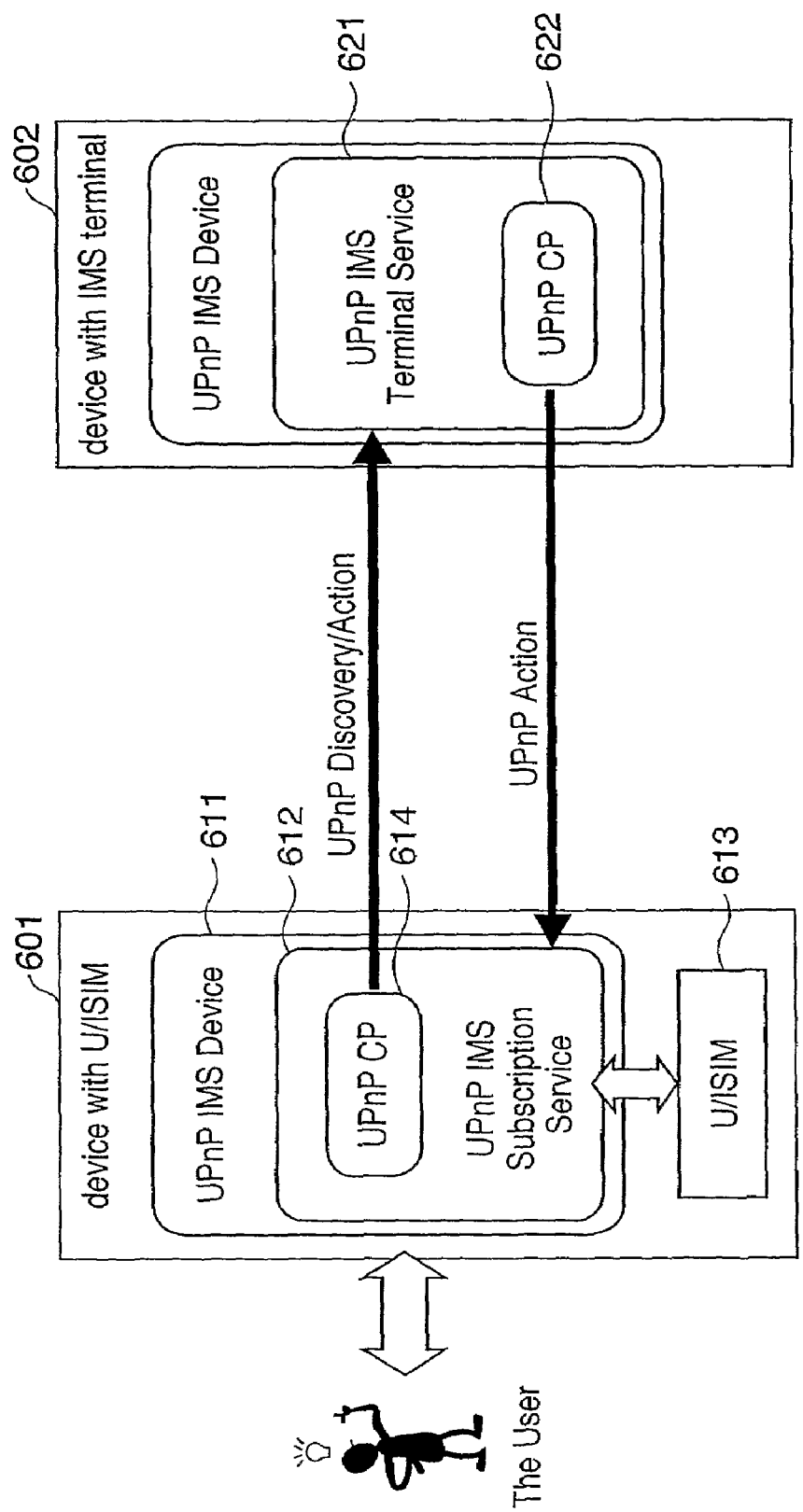
FIG. 6 illustrates an overview of "Solution B" according to the embodiment of the present invention.

This alternative solution (FIG. 6) is applied to the following service scenario:

The user initiates UPnP discovery of available IMS terminals 602 using e.g. his/her IMS phone 601. The IMS subscription (i.e., U/ISIM) in the IMS phone 601 is used for IMS registration while the IMS terminal function 621 in a different user device 602 is used.

As shown in the figure, the solution defines two UPnP services: IMS Subscription Service 612 and IMS Terminal Service 621 on the top of the defined UPnP user device: UPnP IMS Device, each of which conceptually contains an UPnP CP function so that each of the services can interact as detailed later.

The IMS Subscription Service 612 provides the same actions as Solution A described above.

The IMS Terminal Service 612 provides, but is not limited to, the following UPnP action in addition to the IMS termination function toward the IMS Core system:

Set Control URL: This action is used by the CP 614 to provide the IMS Terminal Service 621 with the control URL of the IMS Subscription Service 612 that the user wants to use.

Figure 7:
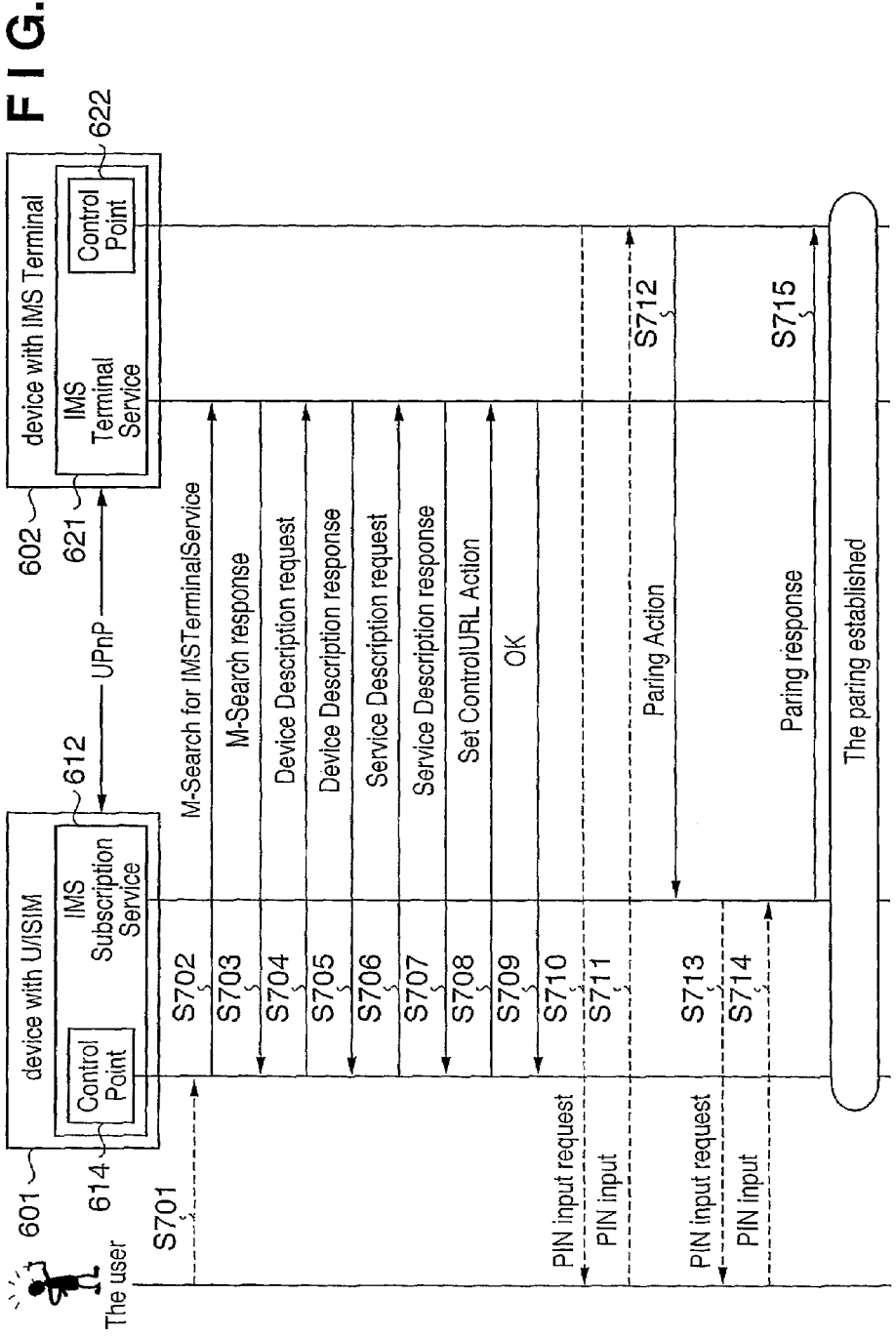
FIG. 7 illustrates a procedure where an U/ISIM holding user device discovers and selects an IMS terminal service of an IMS user device and establishes a paring with the IMS user device in Solution B.
Figure 8:
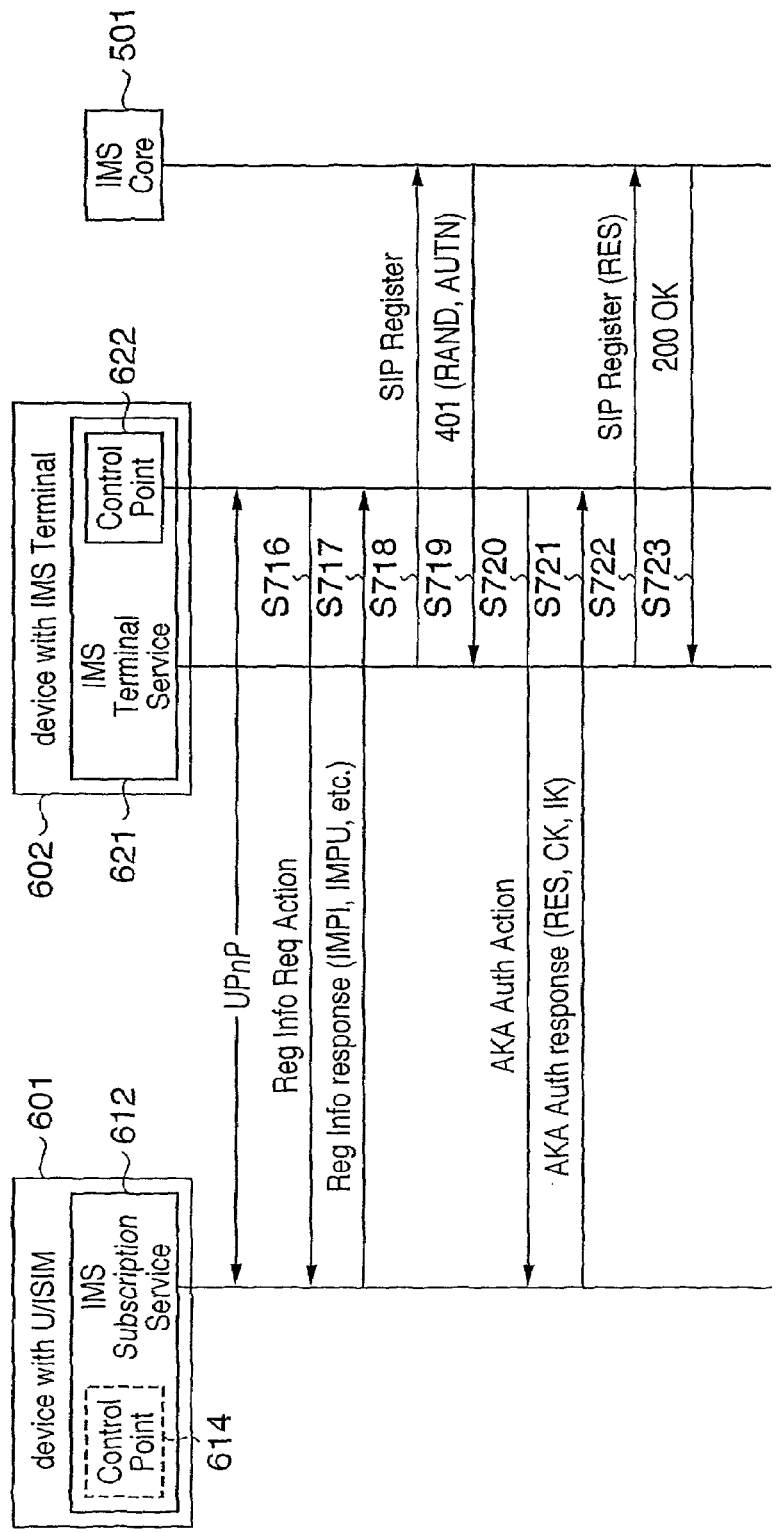
FIG. 8 illustrates an IMS registration procedure in Solution B.

FIGS. 7 and 8 below illustrate an example procedure of how IMS registration is performed using the INS Terminal Service 621 and the IMS Subscription Service 612. The Pairing action in this solution is identical to that in Solution A.

In step S701, the user commands CP 614 to initiate UPnP discovery for IMS Terminal Services 621.

In steps S702-S707, CP 614 performs the standard UPnP discovery procedure. The service type to discover is set to a defined service identity in the form of URN for IMS Terminal Service 621. If multiple user devices owning the target service are discovered, the user selects one of the discovered user devices after step S707, based on the information in the device description or service descriptions.

In steps S708-S709, CP 614 sends a Set Control URL action request to the target IMS Terminal Service 621, which contains the control URL of the IMS Subscription Service 612 and the service description document. The IMS Terminal Service 621 stores this control URL in its memory so that CP 622 can use it in the latter steps.

In steps S710-S711, the IMS Terminal Service 621 starts CP 622, which then requests that the user input a PIN code through the user interface.

In step S712, CP 622 sends a Pairing action request to the control URL which was received and stored by the local IMS Terminal Service 621. As an example in this document, this request contains a random nonce and an authentication code in the same manner as described in Solution A.

In steps S713-S714, the IMS Subscription Service 612 requests the user to input the (same) PIN again on this user device.

The IMS Subscription Service 612 verifies the authentication code in the same way as in Solution A.

In step S715, the IMS Subscription Service 612 returns a Pairing response. This response includes two new random nonce's and an authentication code. In the same way as in the Solution A, CP 622 verifies validity of the corresponding IMS Subscription Service 612 and the two parties agree on the shared key.

At this time, the pairing is successfully established.

Following step S715, CP 622 proceeds with the following steps shown in FIG. 8:

In steps S716-S717, the CP 622 performs the Registration Information Request action. The IMS Subscription Service 612 returns the information necessary for the IMS terminal function 621 in the same way as described in Solution A.

In steps S718-S719, the IMS Terminal Service 621 sends an initial SIP Register request based on the information. It receives a 401 response including RAND and AUTN from the IMS Core system 501.

In steps S720-S721, CP 622 invokes an AKA Authentication action with arguments (the RAND and the AUTN) and gets a response which contains RES, CK, and IK. This procedure is the same as described in Solution A.

In steps S722-S723, the IMS terminal function 621 re-sends a SIP Register containing the RES, which results in the successful IMS registration. CK/IK is used to establish IPsec channels toward the IMS Core system 501.

Using Ssolution B, the IMS phone (e.g., fixed IMS phone or mobile IMS phone) is not required to open and listen on its multicast socket for reacting to incoming M-Search requests because the IMS phone always plays a role to discover the service. This becomes advantageous compared to Solution A in terms of privacy. In Solution A, the presence of the IMS phone will be disclosed over UPnP networks, which may not be desirable for IMS phone users, as the IMS phone has to open and listen to the multicast socket so that other user devices can discover the IMS Subscription Service 312 in the IMS phone. In contrast, although the IMS Subscription Service 612 is provided by the IMS phone in this solution as well, the IMS phone only needs to listen to the control URL of the service.

[OMA Smartcard Web Server]

This subsection proposes an alternative implementation option of the proposed UPNP service: IMS Subscription Service, with a combination of an OMA Smartcard Web Server.

Smartcard Web Server (SCWS) developed by OMA provides another means to allow the remote access to a smartcard. An HTTP server (i.e., SCWS) is running inside the smartcard to allow a remote HTTP client to access the smartcard. Access security to the SCWS is ensured by standard HTTP Basic/Digest authentication and TLS.

Server applications in the smartcard, that are registered to the SCWS and are identified by the HTTP URL, can be triggered by the SCWS when the SCWS receives HTTP requests destined to the HTTP URL from remote HTTP clients. A server application performs a specific task and may dynamically create content and return it to the SCWS. The HTTP client eventually receives the content.

In this implementation option, the UPnP IMS Subscription Service behaves as a front end of the SCWS so that IMS user devices can discover the SCWS through UPnP. In this case, the IMS user device does not use UPnP actions (e.g., Registration Information Request, AKA Authentication actions as proposed above), but instead uses HTTP requests to obtain necessary information for IMS registration directly from the SCWS. As one example embodiment, one server application can be registered to the SCWS, which performs a specific task for returning necessary information for IMS registration (e.g., IMPI, IMPU, AKA credentials, etc.) in answer to client's requests via the SCWS.

Accordingly, the UPnP IMS Subscription Service provides, but not limited to, the following action:

SCWS Information Request:

This action is used to request relevant HTTP URL information served by the SCWS. For example, the action returns two URLs, one of which is used to retrieve identity information such as IMPI, IMPU, Home Domain URI or the like that are needed for an IMS user device to send a first SIP Register message. Another URL is used to request AKA credentials (i.e., RES, CK, and IK) that are needed to send a second SIP Register message.

As another example, the action may return only one URL, which is a root URL of the target server application registered to the SCWS, for example: https://192.168.0.1/ims_registration/. The IMS user device then generates two URLs corresponding to the above two URLs based on a pre-determined rule.

The invention does not preclude all potential embodiments for this realization.

In addition, the UPnP IMS Subscription Service may provide the Pairing and TerminatePairing actions proposed already in order to complement security operation provided by the SCWS (e.g., HTTP authentication and TLS).

<Procedure in Solution A>

Figure 9:
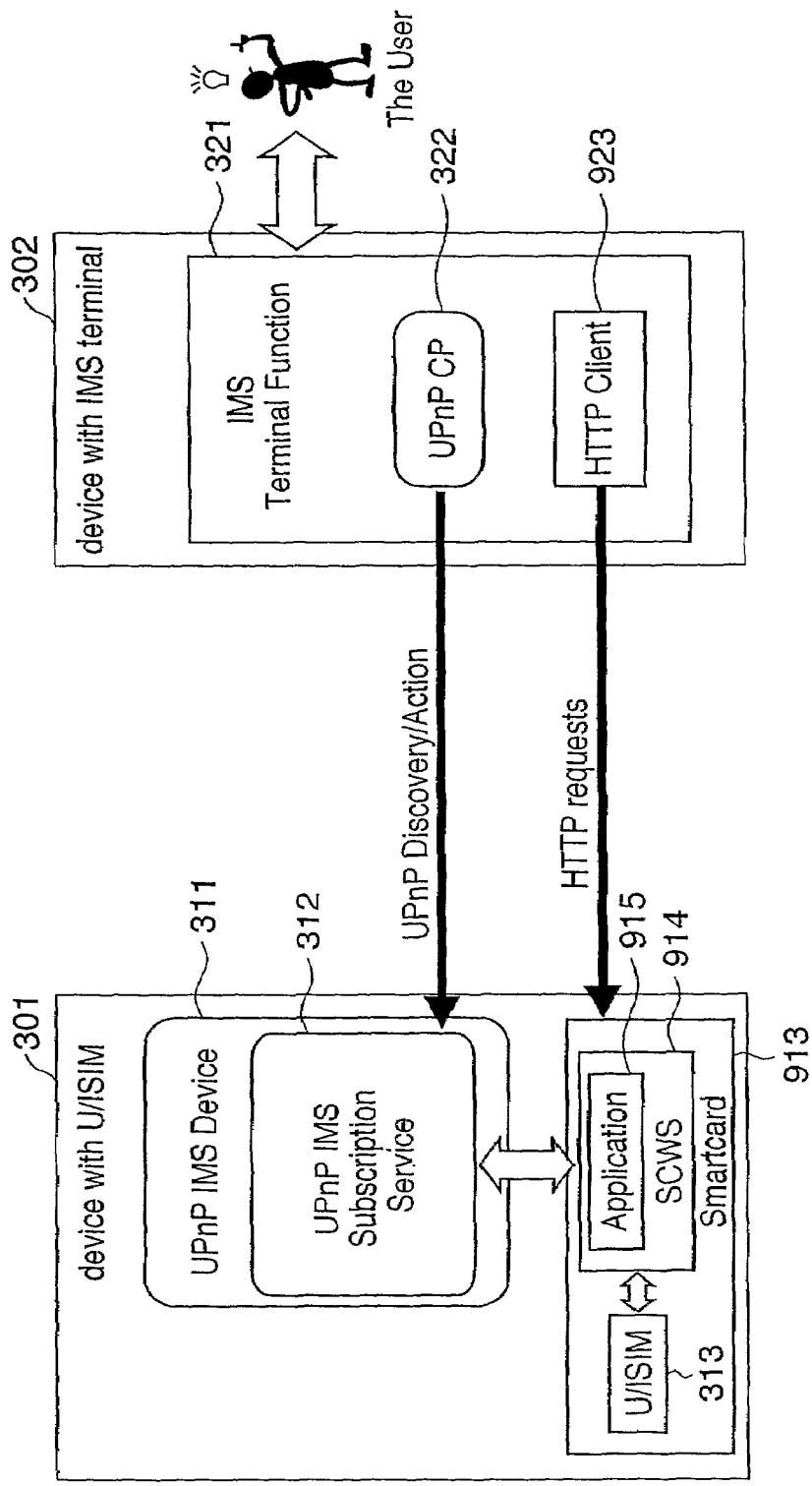
FIG. 9 illustrates an overview of an SCWS-based IMS subscription service for a variation of Solution A.

FIG. 9 shows an architectural overview of Solution A. The IMS Subscription Service 312 is able to locally interact with the SCWS in order to retrieve the relevant URL information for serving the SCWS Information Request action. The "application 915" inside the SCWS 914 represents the server application in the smartcard 913 that performs the aforementioned specific task. It can communicate with USIM or ISIM 313 inside the smartcard 913.

Once the UPnP CP 322 in the IMS terminal 321 discovers the IMS Subscription Service 312 and obtains the relevant URL information via the UPnP action, it hands over all control to a local HTTP client 923, which then initiates interaction with the SCWS 914 for retrieving the necessary information for IMS registration.

Figure 10:
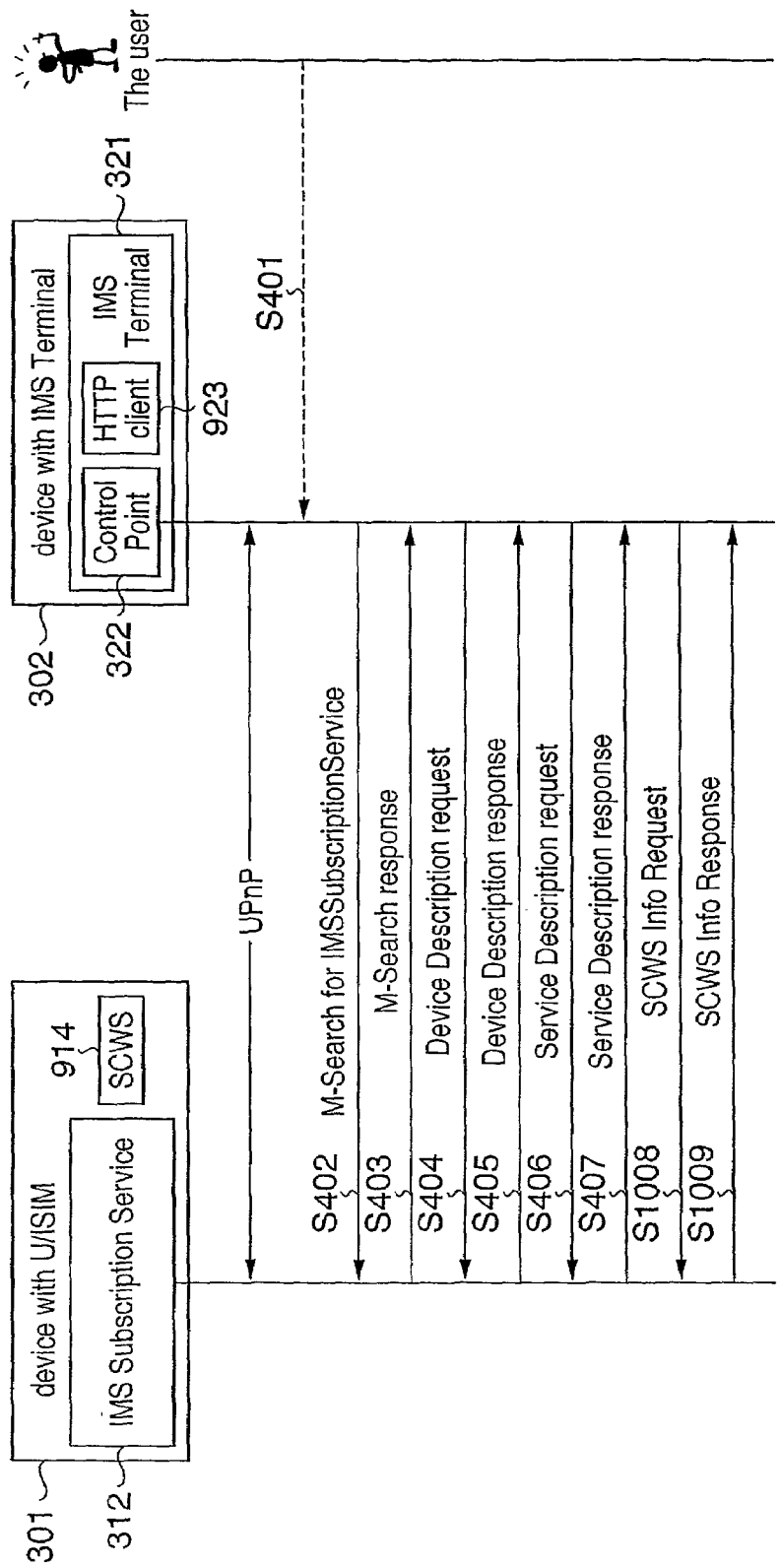
FIG. 10 illustrates a procedure where an IMS user device discovers and selects the SCWS-based IMS subscription service in the variation of Solution A.
Figure 11:
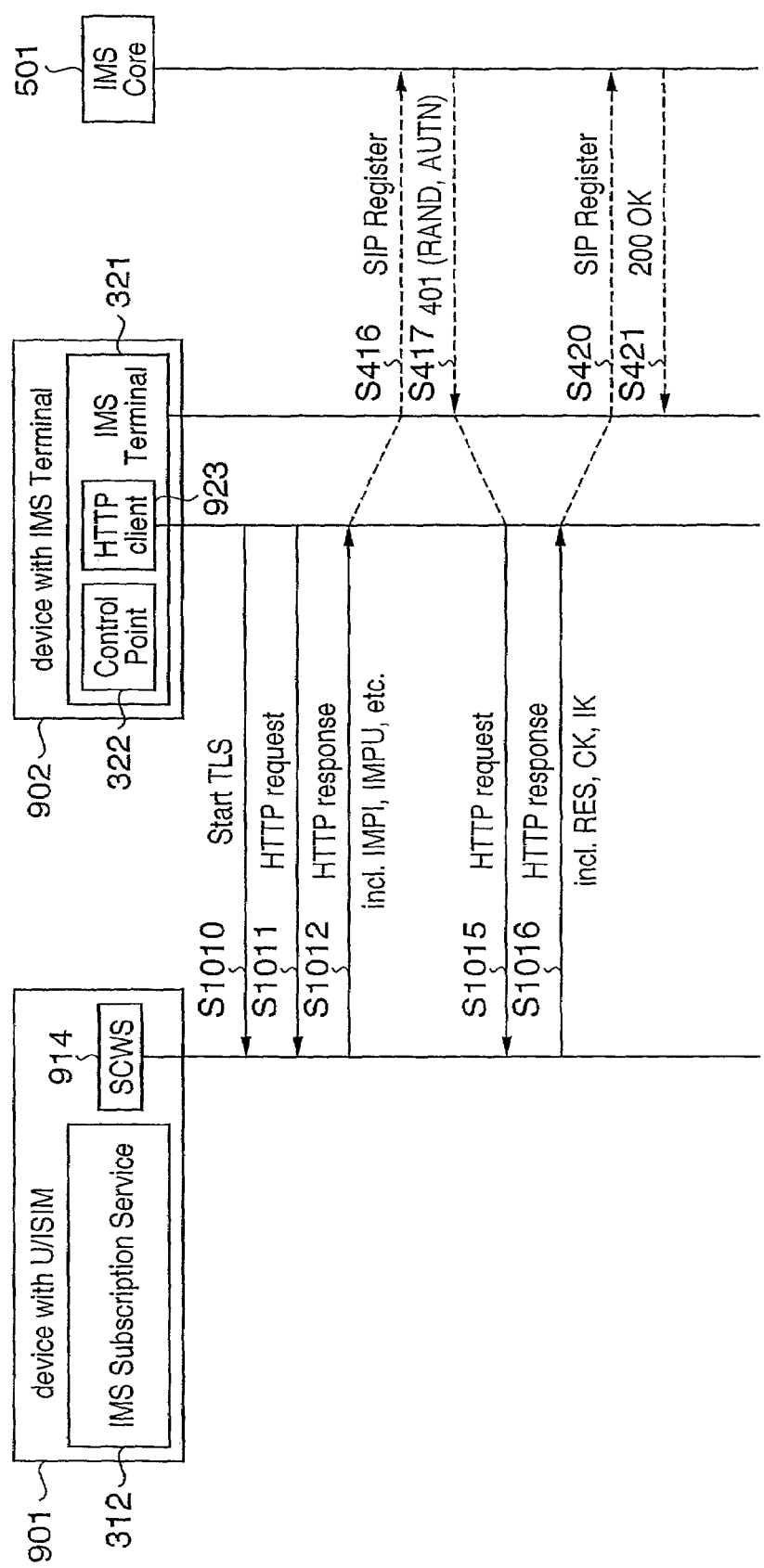
FIG. 11 illustrates an IMS registration procedure in the variation of Solution A.

FIGS. 10 and 11 illustrate an example procedure of how IMS registration is performed using the IMS Subscription Service 312 and the SCWS 914.

In steps S1008-S1009, the CP 322 sends a SCWS Information Request action. The IMS Subscription Service 312 returns the relevant HTTP URL information to the CP 322, which is to be used in step S1011 and step S1015 below. At this time, the CP 322 transfers control to the local HTTP client 923 that proceeds from step S1010.

In step S1010, the HTTP client 923 in the IMS Terminal 321 starts a TLS session with the SCWS 914 as defined by the SCWS standard.

In steps S1011-S1012, the HTTP client 923 sends an HTTP request to the SCWS 914. This request may contain an HTTP header for HTTP authentication as defined by the SCWS standard, to authenticate the user for access to the SCWS 914. In this case, the user is required to enter a user name and password before step S1011, for example. The username and password may be pre-configured in the SCWS 914, but how the user is authenticated in this invention follows the actual implementation of the SCWS 914.

A successful HTTP response contains information necessary for the IMS terminal 321 to send an initial SIP Register request (e.g., IMPI, IMPU, etc).

In steps S1015-S1016, the HTTP client 923 sends an HTTP request containing the RAND and AUTN. The SCWS 914 returns a response that contains RES, CK, and IK.

<Procedure in Solution B>

Figure 12:
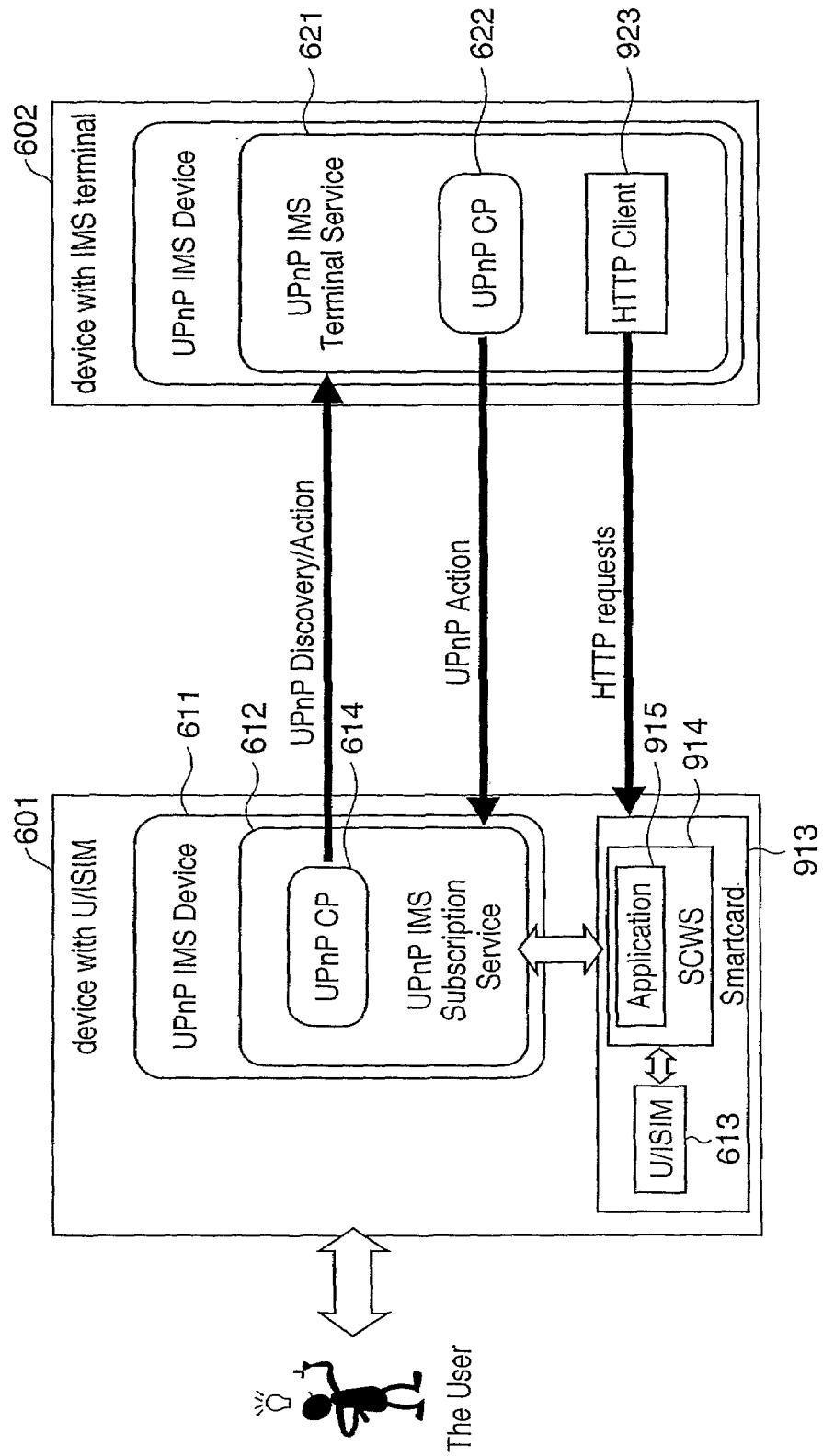
FIG. 12 illustrates an overview of an SCWS-based IMS subscription service for a variation of Solution B.

FIG. 12 shows an architectural overview for the Solution B. The SCWS-related parts are the same as those shown in FIG. 9. The application 915 can communicate with USIM or ISIM 613 inside the smartcard 913. IMS Terminal Service 621 in the IMS user device 602 conceptually contains an HTTP client 923 as well as a UPnP CP 622 in order to illustrate functional level cooperation among the components. The IMS Terminal Service 621 provides said Set Control URL action in addition to the IMS terminal functionality toward the IMS Core system 501.

Figure 13:
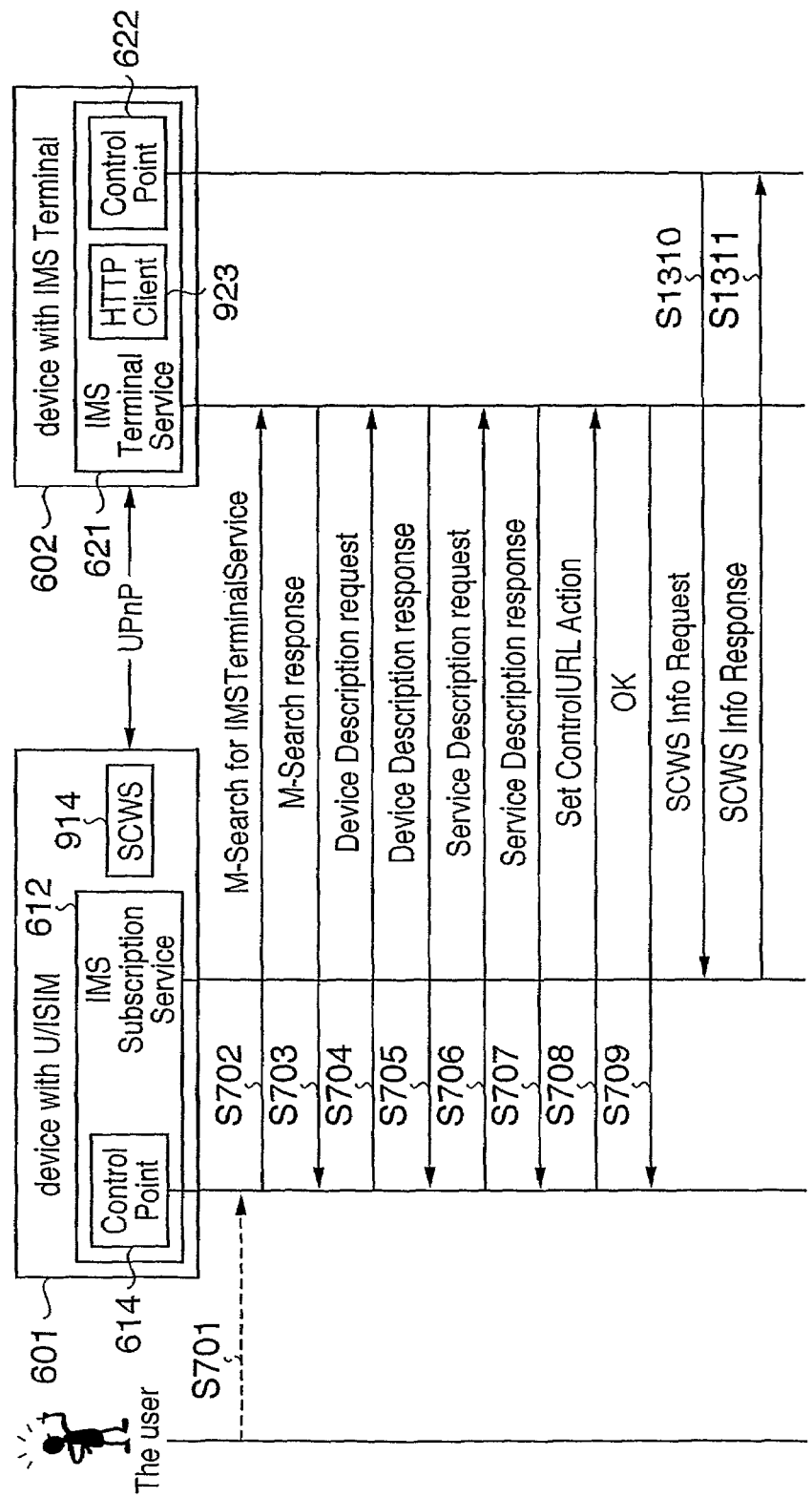
FIG. 13 illustrates a procedure where U/ISIM holding user device discovers and selects an IMS terminal service and retrieves SCWS information in the variation of Solution B.
Figure 14:
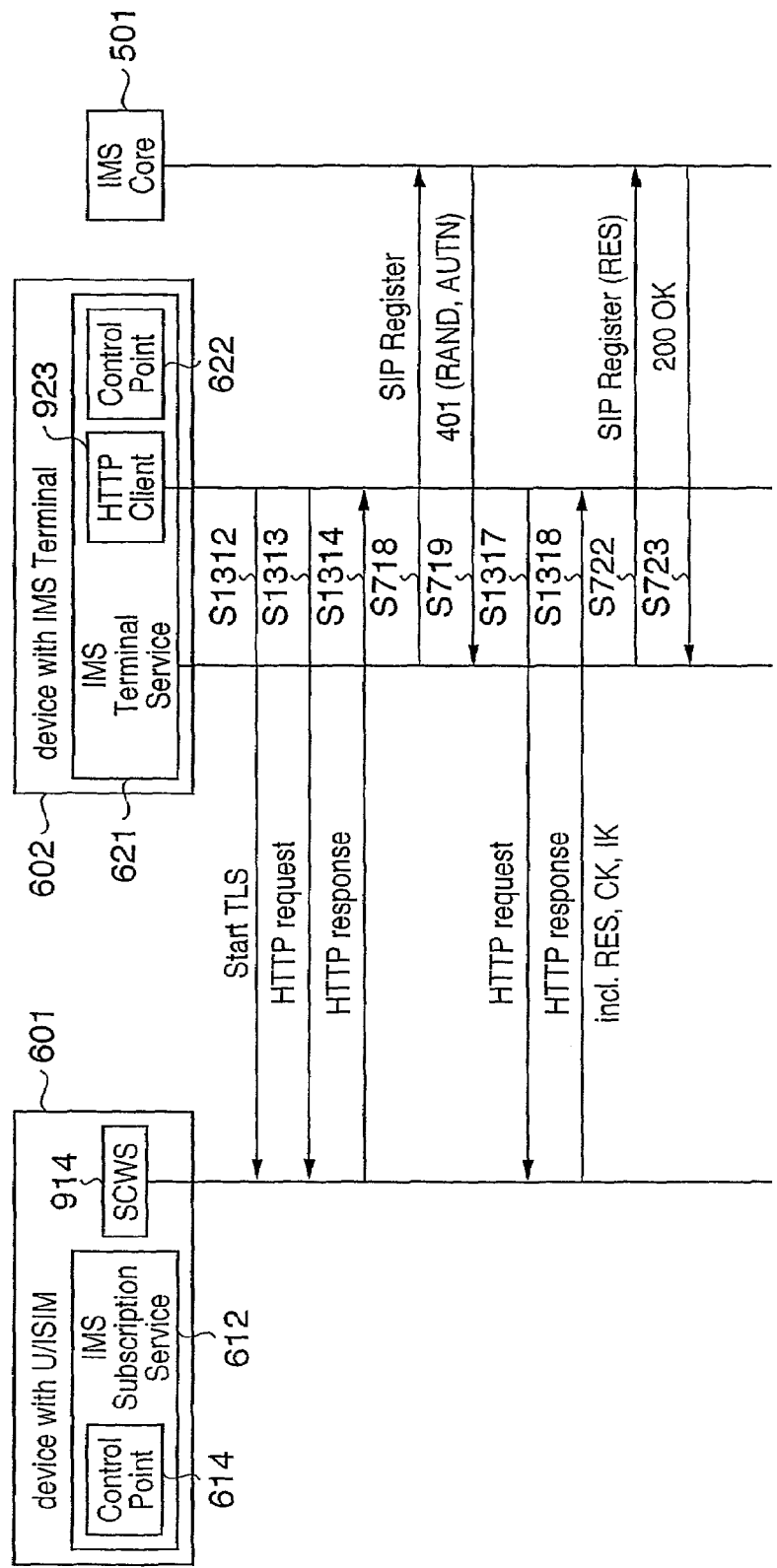
FIG. 14 illustrates an IMS registration procedure in the variation of Solution B.

FIGS. 13 and 14 below illustrate an example procedure of how IMS registration is performed using the IMS Terminal Service 621 and the IMS Subscription Service 612.

In steps S1310-1311, using the control URL obtained in step S708, the IMS Terminal Service 621 initiates CP 622 to send a SCWS Information Request action. The IMS Subscription Service 612 returns the relevant HTTP URL information to CP 622, which is to be used in steps S1013-S1017 below. At this time, CP 622 transfers control to the local HTTP client 923.

In step S1312, the HTTP client 923 in the IMS Terminal 621 starts a TLS session to the SCWS 914 as defined by the SCWS standard.

In steps S1313-S1314, the HTTP client 923 sends an HTTP request to the SCWS 914. This request may contain an HTTP header for HTTP authentication as described in FIG. 11 in step S1011.

In steps S1317-S1318 the HTTP client 923 sends an HTTP request containing the RAND and AUTN. The SCWS 914 returns a response that contains RES, CK, and IK.

Advantages of the Invention

The user can dynamically discover available IMS terminal functionality and IMS subscriptions (i.e., USIM or ISIM) in the UPnP network, which enables the dynamic composition of an IMS user agent.

Definition of the front-end UPnP service of a Smartcard Web Server allows a simplification of the dynamic discovery of the SCWS, which has heretofore not been possible. Such a standards-based remote SIM access approach provides a more deployable solution.

[Abbreviations]
UPnP Universal Plug and Play
CP Control Point
IMPI IMS Private User Identity
IMPU IMS Public User Identity
IMSI International Mobile Subscriber Identity
AKA Authentication and Key Agreement
USIM Universal Subscriber Identity Module
ISIM IMS Subscriber Identity Module
UICC Universal Integrated Circuit Card
URN Uniform Resource Name
SCWS Smartcard Web Server

The invention claimed is:

1. A user device that has IP Multimedia Subsystem (IMS) subscription information, comprising:
    a memory;
    a processor being operable to:
        search, based on UPnP technology, a UPnP network for another user device that is equipped with IMS functionality and UPnP functionality, and to send a control URL to the discovered other user device via a first UPnP command;
        generate an encryption key shared with the other user device in response to a second UPnP command addressed to the control URL from the other user device,
        establish a session, which is secured using the encryption key, with the other user device; and
        send the IMS subscription information to the other user device via the session in response to a third UPnP command addressed to the control URL from the other user device.

2. The user device according to claim 1, further comprising:
    a graphical display operable to display, if a plurality of the other user devices are discovered by the processor, a list of said plurality of the other user devices, wherein the processor sends the control URL to one of the other user devices selected from the list.

3. The user device according to claim 1, wherein the processor is further operable to:
    receive a fourth UPnP command from the other user device, and
    send the control URL to the other user device in response to the fourth UPnP command.

4. The user device according to claim 1, wherein the processor is further operable to:
    receive first authentication information from the other user device via the session; and
    calculate second authentication information based on the first authentication information, wherein the processor sends the second authentication information to the other user device via the session in response to the first authentication information.

5. The user device according to claim 1, wherein the IMS subscription information is contained in a USIM or ISIM application of the user device.

6. An IP Multimedia Subsystem (IMS) user equipment composed of the user device according to claim 1 and the other user device.

7. A method for controlling a user device that has IP Multimedia Subsystem (IMS) subscription information, comprising steps of:
    searching, based on UPnP technology, a UPnP network for another user device that is equipped with IMS functionality and UPnP functionality;
    sending a control URL to the discovered other user device via a first UPnP command;
    generating an encryption key shared with the other user device in response to a second UPnP command addressed to the control URL from the other user device, and establishing a session, which is secured using the encryption key, with the other user device; and
    sending the IMS subscription information to the other user device via the session in response to a third UPnP command addressed to the control URL from the other user device.

8. The method according to claim 7, further comprising a step of:
    displaying, if a plurality of the other user devices are discovered in the step of searching, a list of said plurality of the other user devices, wherein, in the step of sending the control URL, the control URL is sent to one of the other user devices selected from the list.

9. The method according to claim 7, further comprising steps of:
    receiving a fourth UPnP command from the other user device; and
    sending the control URL to the other user device in response to the fourth UPnP command.

10. The method according to claim 7, further comprising steps of:
    receiving first authentication information from the other user device via the session;
    calculating second authentication information based on the first authentication information; and
    sending the second authentication information to the other user device via the session in response to the first authentication information.

11. The method according to claim 7 wherein the IMS subscription information is contained in a USIM or ISIM application of the user device.

12. A user device that has a smartcard storing an Smartcard Web Server (SCWS) and IP Multimedia Subsystem (IMS) subscription information, comprising:
    a memory;
    a processor being operable to:
        search, based on UPnP technology, a UPnP network for another user device that is equipped with IMS functionality and UPnP functionality, and send a control URL to the discovered other user device via a first UPnP command;
        send an HTTP URL of the SCWS to the other user device in response to a second UPnP command addressed to the control URL from the other user device;

establish a session, which is secured using TLS, with the other user device in response to a session establishment request addressed to the HTTP URL; and send the IMS Subscription information to the other user device within a first HTTP response to a first HTTP request addressed to the HTTP URL.

13. The user device according to claim 12, wherein the processor is further operable to:

receive a third UPnP command from the other user device, and send the control URL to the other user device in response to the third UPnP command.

14. A method for controlling a user device that has a smartcard storing an Smartcard Web Server (SCWS) and IP Multimedia Subsystem (IMS) subscription information, comprising steps of:

searching, based on UPnP technology, a UPnP network for another user device that is equipped with IMS functionality and UPnP functionality;

sending a control URL to the discovered other user device via a first UPnP command; sending an HTTP URL of the SCWS to the other user device in response to a second UPnP command addressed to the control URL from the other user device;

establishing a session, which is secured using TLS, with the other user device in response to a session establishment request addressed to the HTTP URL; and sending the IMS subscription, information to the other user device within a first HTTP response to a first HTTP request addressed to the HTTP URL.

15. The method according to claim 14, further comprising steps of:

receiving a third UPnP command from the other user device; and sending the control URL to the other user device in response to the third UPnP command.

\* \* \* \* \*